Nov. 4, 1924.
1,514,419
P. J. BERGGREN
BINOCULAR
Filed Sept. 16, 1918  2 Sheets-Sheet 1
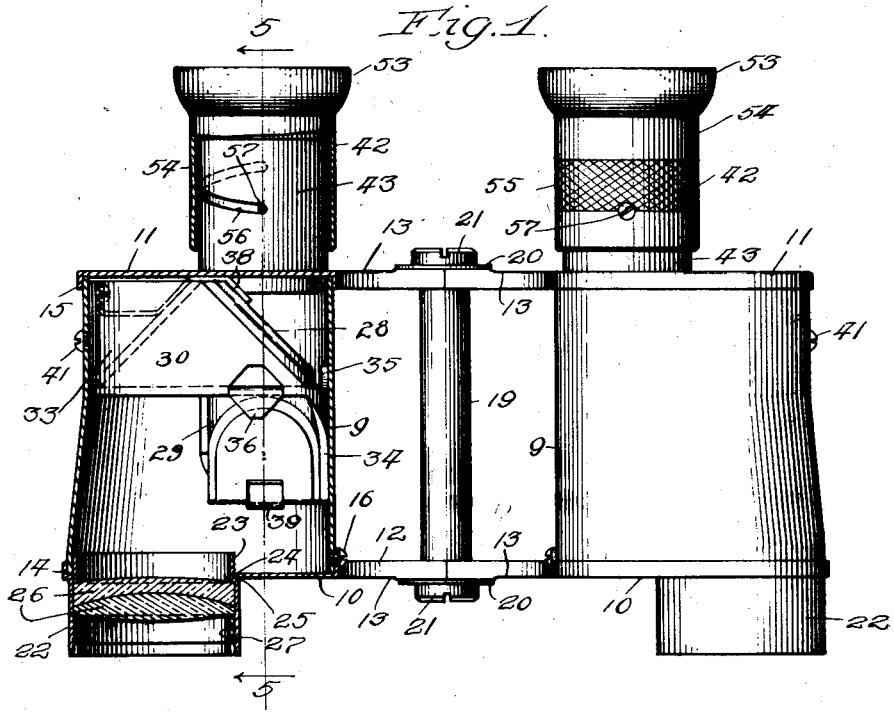
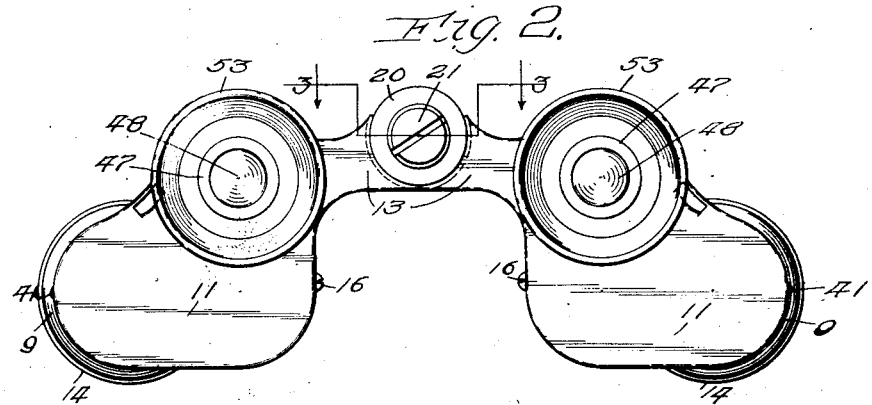
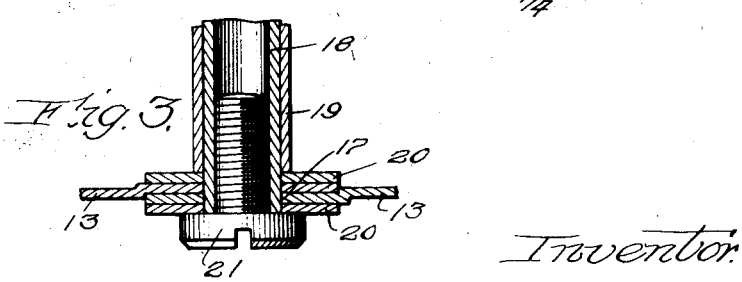
Inventor
Pèr Johan Berggren,
By Glenn S. Noble
Atty.
Witness:
H. L. Farrington Nov. 4, 1924.
P. J. BERGGREN
BINOCULAR
Filed Sept. 16, 1918
1,514,419
2 Sheets-Sheet 2
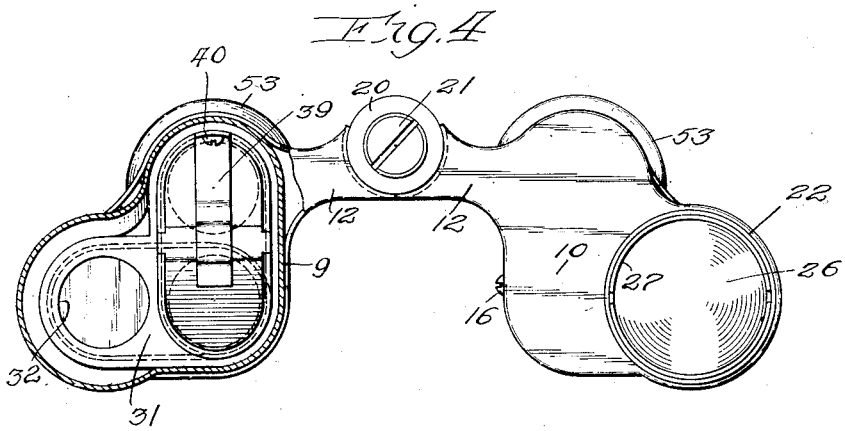
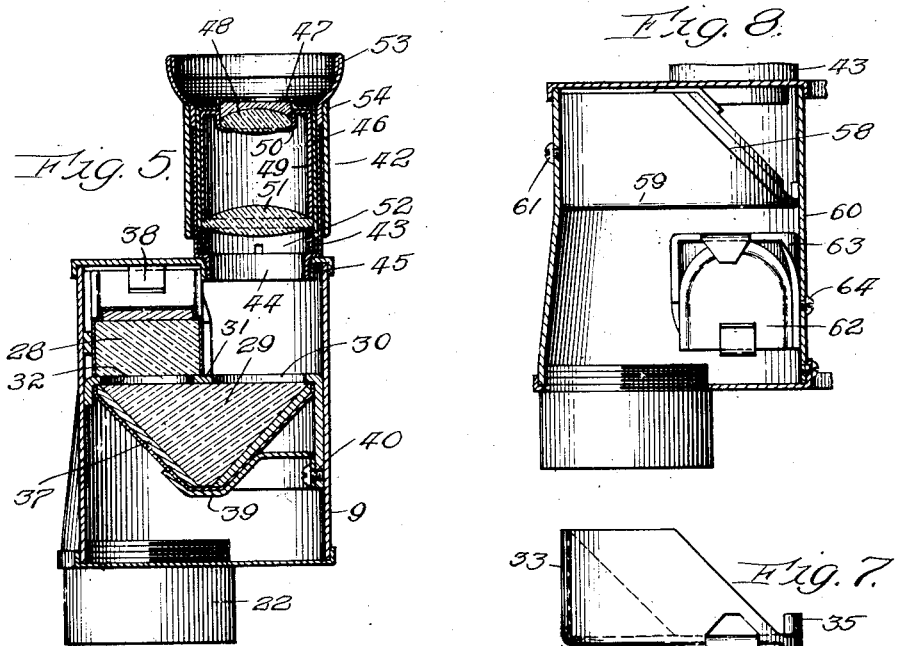
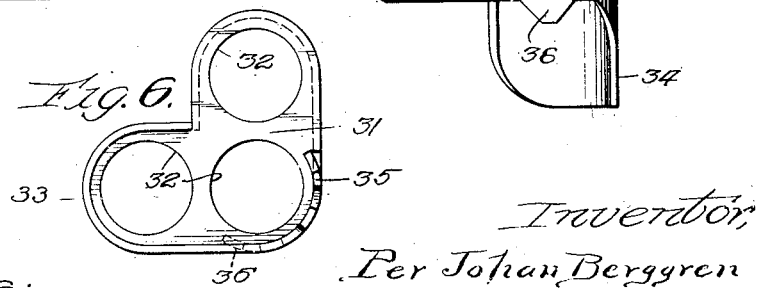
Inventor,
Per Johan Berggren
By Glenn S. Noble
Atty.
Witness:

Patented Nov. 4, 1924.

1,514,419

UNITED STATES PATENT OFFICE.

PER JOHAN BERGGREN, OF CHICAGO, ILLINOIS.

BINOCULAR.

Application filed September 16, 1918. Serial No. 254,261.

*To all whom it may concern:*

Be it known that I, PER JOHAN BERGGREN, a subject of the King of Sweden, residing at Chicago, in the county of Cook and State of Illinois, have invented certain new and useful Improvements in Binoculars, of which the following is a specification.

Telescopes of the type commonly known as binoculars have heretofore usually been made with cast metal barrels or body pieces, and the objective and ocular tubes were usually made of hard rubber or fiber which is more or less apt to be easily cracked or broken. Furthermore in the usual construction of these binoculars, the prisms are mounted in the barrels so that they require exceedingly careful adjustment, and in fact the whole construction is so complicated that it requires an expert to be able to take one of these instruments apart for the purpose of cleaning the same and again assembling it so that it may be used. These disadvantages are particularly apparent where the devices are subjected to comparatively rough usage as for the Army and Navy purpose, or the like.

The present invention relates particularly to improvements in the general construction of such binoculars, and more particularly to the simplification and arrangement of the parts so that they may be readily constructed and assembled.

The objects of this invention are to provide an improved form of binocular; to provide a binocular telescope in which the principal parts are formed of drawn or pressed sheet metal; to provide a binocular which may be readily taken apart for cleaning and again assembled without the necessity of special adjustments; and in general to provide such an improved construction as will appear more fully from the following description taken in connection with the accompanying drawings. As shown in these drawings;

Fig. 1 is a side view, partially in section, of a binocular embodying the principal features of this invention;

Fig. 2 is an end view of the same from the ocular end;

Fig. 3 is a sectional view taken on the line 3—3 of Fig. 2;

Fig. 4 is an end view taken from the objective end with parts shown in section;

Fig. 5 is a sectional view taken on the line 5—5 of Fig. 1;

Figs. 6 and 7 are details of the prism bracket or holder; and,

Fig. 8 is a fragmentary view showing a modified form of construction.

In accordance with my invention, the binocular is provided with barrels or body portions 9 which are preferably formed of sheet metal as by drawing or pressing, or may be formed from tubing by shaping the same to the proper configuration. These barrels are provided with end pieces or closures 10 and 11 which are also drawn or stamped from sheet metal and are provided with arms or projections 12 and 13 respectively for hinging the barrels together. The heads or end pieces are preferably provided with flanges 14 and 15 which fit over the ends of the barrel, and the parts are secured together by means of screws 16 or the like. The hinge arms 12 and 13 are provided with holes 17 for receiving a pintle 18. A spreader tube or sleeve 19 fits over the pintle 18 and washers 20 are preferably arranged at either side of the hinge arms. Screws 21 are inserted in the ends of the pintle and holds the parts together, as shown in Fig. 3. By means of this hinge arrangement, the pupillary distance may be readily adjusted and the friction will hold the parts in adjusted position.

The objective tubes 22 are also preferably formed from tubing or drawn from sheet metal and threaded at their inner ends, as indicated at 23, to engage with the correspondingly threaded holes 24 in the barrel ends 10. These tubes are preferably shouldered, as indicated at 25, so that they will be in fixed position when inserted. This shoulder also serves to fix the position of the objective or lens 26 which is held in position by means of a threaded ring 27 which engages with the correspondingly threaded end of the tube 22.

The prisms 28 and 29 are mounted in a bracket or holder 30 which is also preferably stamped or formed from sheet metal. This bracket or holder, as shown in Figs. 6 and 7, comprises a transverse plate 31 with holes 32 for the passage of the rays of light. This plate has oppositely arranged, somewhat semi-circular flanges 33 and 34 for receiving and supporting the prisms 28 and 29 respectively. Clips or tabs 35 and 36 are also preferably provided for engagement with the ends of the respective prisms. These prisms are provided with their usual mountings or covers 37 and are held in position by means of fingers or locking pieces 38 and 39. These fingers are preferably made of springs or resilient material so that they will hold the prisms securely against the plate 30. These spring fingers are secured to the flanges 33 and 34 by means of screws 40 or in any other convenient manner. The prism brackets or holders 30 fit closely within the barrels 9 and are held in position by means of screws 41 or other similar fastening means and it will be seen that these brackets with the prisms therein may be readily removed from the barrels.

The ocular tubes 42 are also preferably made entirely of metal with the parts drawn or stamped, and are constructed so as to give the proper adjustment for focusing the instrument. These tubes are composed of main cylindrical members 43 which are provided with reduced inner ends 44 to form outer and inner shoulders. These reduced ends are threaded to correspond with threaded engaging flanges 45 which extend inwardly from the ends or covers 11. A second tube 46 fits in the tube 43 and is provided at its outer end with a flange 47 for engagement with the lens 48. A third tube 49 fits in the tube 46 and is provided with a flange 50 which co-acts with the flange 47 for holding the lens 48. The lens 51 fits in the tube 43 and rests against the end of the tube 49. A threaded ring 52 engages with the correspondingly threaded end of the tube 46 and holds the parts contained therein in position. The eye piece 53 is secured in the end of a sleeve 54 which extends down over the tube 43 and is preferably knurled, as indicated at 55, for turning the same. The tube 43 is provided with a cam slot 56, and a screw 57 passes through the sleeve 54 and through this slot and engages with the tube 46 thereby connecting the lens supporting tube with the adjusting sleeve, the arrangement being such that when the sleeve is turned, the screw will ride along the cam and cause the ocular lenses to be adjusted longitudinally.

From this description it will be seen that I provide an improved form of binocular which may be constructed almost entirely out of drawn or stamped metal and the parts formed so that they may be assembled without the necessity of difficult and tedious adjustments. The ocular tubes being formed in the manner described are particularly strong and serviceable and are not apt to be injured even by rough treatment such as is apt to occur when the instruments are used for war purposes. It will also be noted that the parts may be readily taken apart without the aid of any special tools and may again be quickly assembled even by the most inexperienced person. For this reason if the lenses or prisms become dirty or if the instrument should be dropped in the water or mud, it may be readily taken apart and cleaned and again assembled in a very short time, whereas with the present well known forms of binoculars, this is usually an operation which requires the service of an expert and frequently it is exceedingly difficult to again put the parts together so as to give the proper images. It will be particularly noted that the prisms may be readily removed from their brackets or cages by merely bending the spring fingers which will release the same, and when they are replaced, these fingers will hold the prisms securely in proper position.

In the modified form of construction shown in Fig. 8, the prisms are held in separate brackets instead of in a single bracket as in the form described. In this instance the prism 58 is held in a bracket 59 which is mounted in the barrel 60 and is held by means of one or more screws 61. The prism 62 is mounted in a bracket 63, which is held in position by one or more screws 64 as will be readily apparent from the drawing.

Various changes may be made in the particular form and arrangement of parts without departing from the scope of this invention, and therefore, I do not wish to be limited to the exact construction or arrangement above described, but what I claim and desire to secure by Letters Patent is:

1. A binocular comprising barrels formed of drawn metal with end plates having flanges extending around substantially the entire periphery thereof, one end of each of said plates being adapted to fit over the end of one of the barrels, the opposite ends of the plates which are not flanged, being overlapped to form hinges, a pintle connecting said overlapping ends, stamped metallic brackets secured in said barrels, prisms mounted in said brackets, spring fingers secured to said brackets for holding said prims in position, objective tubes and ocular tubes formed of drawn metal parts, mounted in said barrels, said tubes containing the necessary lenses, substantially as described.

2. The combination with a binocular having barrels and objective lenses and ocular lenses, of brackets formed of stamped metal, said brackets comprising lateral plates with oppositely disposed flanges for receiving the prisms said flanges fitting closely within the barrel and being sufficiently long to prevent lateral movement of the bracket in the barrel, means for holding the bracket in position in the barrel, prisms engaging with said bracket, and spring fingers connected with the bracket and adapted to engage with the prisms for holding them in position.

3. An ocular device of the character set forth, comprising a relatively fixed tube with a cam slot therein, an inner sleeve having a flanged outer end, a second sleeve having a flanged outer end and fitting in the first named sleeve, a lens positioned between said flanges and held thereby, a second lens resting against the inner end of the last named sleeve, a ring for holding said lenses and the last named sleeve in position, an eyepiece engaging said first named sleeve, an outer adjusting sleeve carried by said eyepiece, and a screw or the like passing through the adjusting sleeve and engaging said slot.

4. An ocular tube construction comprising a tube formed of drawn metal and having a reduced inner end forming outer and inner shoulders, said reduced end being threaded to engage with the barrel of a binocular, a flanged sleeve fitting in said tube, a second flanged sleeve in said first named sleeve, a lens carried between said flanges, a second lens fitting in said first named sleeve and resting against the end of the second sleeve, a ring for holding said lenses and second sleeve in position, an eyepiece secured to the first sleeve, an outer adjusting sleeve secured to said eyepiece and means for adjusting the sleeves longitudinally of the tube.

5. The combination with a telescope barrel, of a prism holder adapted to fit closely within the barrel, non-adjustable means for securing the holder in position, said holder being adapted to support two prisms, one on either side thereof, and having flanges for engagement with the sides of the prisms and with the sides of the barrel to prevent lateral movement of the holder, and spring fingers secured to the flanges and adapted to engage with the prisms for holding them in position.

PER JOHAN BERGGREN.